US012311506B2

(12) United States Patent
(10) Patent No.: US 12,311,506 B2
(45) Date of Patent: May 27, 2025

Wojtaszek et al.

(54) ANCHOR DRIVER ADAPTER TOOL

(71) Applicants: Simon Rueben Wojtaszek, Midland, MI (US); Samuel Mark Wojtaszek, Midland, MI (US)

(72) Inventors: Simon Rueben Wojtaszek, Midland, MI (US); Samuel Mark Wojtaszek, Midland, MI (US)

( * ) Notice: Subject to any disclaimer, the term of this patent is extended or adjusted under 35 U.S.C. 154(b) by 287 days.

(21) Appl. No.: 17/849,638

(22) Filed: Jun. 25, 2022

(65) Prior Publication Data

US 2023/0027790 A1 Jan. 26, 2023

Related U.S. Application Data

(60) Provisional application No. 63/215,452, filed on Jun. 26, 2021.

(51) Int. Cl.
*B25B 13/50* (2006.01)
*B25B 13/16* (2006.01)

(52) U.S. Cl.
CPC .......... *B25B 13/5091* (2013.01); *B25B 13/16* (2013.01); *B25B 13/50* (2013.01)

(58) Field of Classification Search
CPC ...... B25B 13/5091; B25B 13/16; B25B 13/50
See application file for complete search history.

(56) References Cited

U.S. PATENT DOCUMENTS 55,107 A * 5/1866 Hoyt et al. .............. B25B 13/30 81/118
855,905 A * 6/1907 Rhoads ............... B25B 13/5091 269/254 R
4,798,108 A * 1/1989 Wilson .................... B25B 13/16 81/170
4,967,625 A * 11/1990 Kolari ..................... B25B 13/44 81/170
5,335,569 A * 8/1994 Rowley ............... B25B 13/5091 81/125
6,711,974 B1 * 3/2004 Lin ..................... B25B 13/5091 81/125
2003/0233913 A1 * 12/2003 Hu .......................... B25B 15/00 81/176.3
2009/0031503 A1 * 2/2009 Chase ................. B25B 13/5091 294/209

* cited by examiner

*Primary Examiner* — Bryan R Muller

(57) ABSTRACT

An anchor adapter tool which allows a user to rigidly secure and adapt various styles of anchors to equipment intended to produce the torque required for installation. The rigid connection allows the user increased control over placement and direction of installation. The tool is scalable such that optimized sizing and strength can be obtained for targeted anchors while minimizing weight and space requirements of the tool.

1 Claim, 1 Drawing Sheet

Exploded view and parts

1. Threaded rod for clamp plate
2. Clamp plate
3. Adapter frame
4. Top plate
5. Coupling (1/2" square option)
6. Coupling (3/4" and 1" square drive)
7. Magnet retaining screw
8. Magnet
9. Coupling (1" square option)
10. Clamp plate nut
11. Coupling option (hex rod + nut)

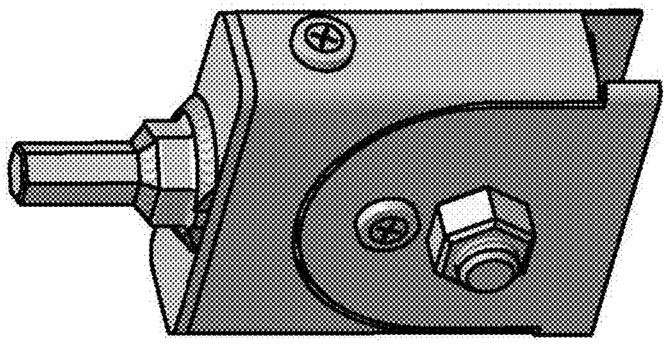
FIG 1. Anchor Adapter Tool
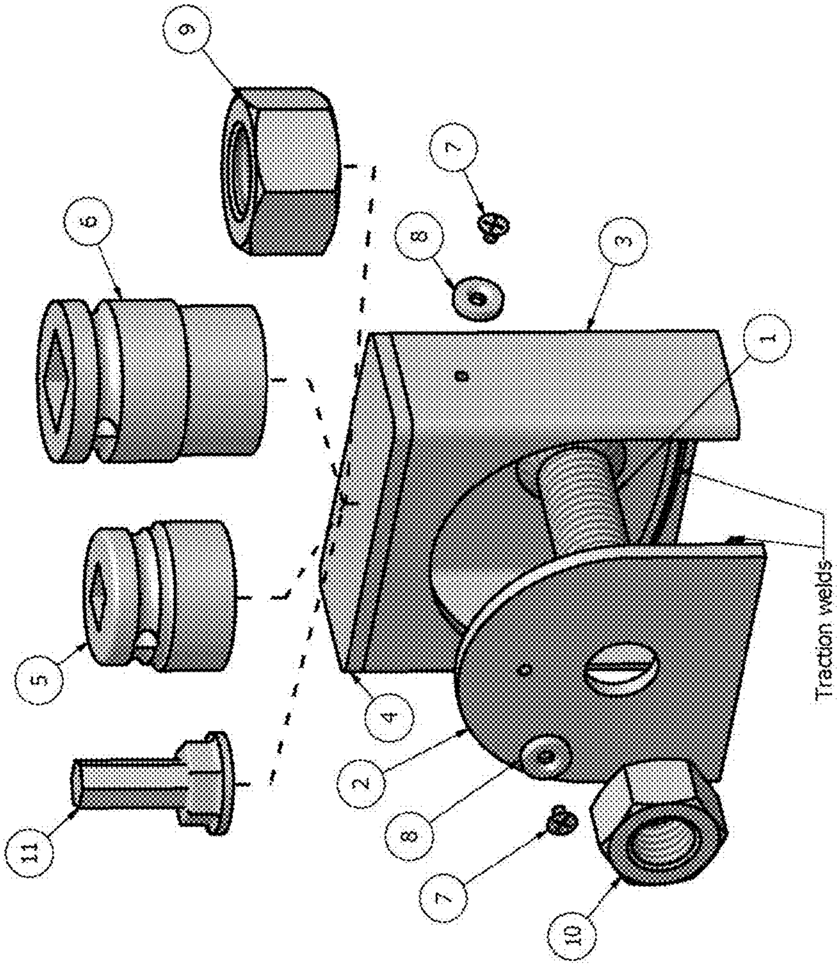
FIG 2. Exploded view and parts
1. Threaded rod for clamp plate
2. Clamp plate
3. Adapter frame
4. Top plate
5. Coupling (1/2" square option)
6. Coupling (3/4" and 1" square drive)
7. Magnet retaining screw
8. Magnet
9. Coupling (1" square option)
10. Clamp plate nut
11. Coupling option (hex rod + nut)

ANCHOR DRIVER ADAPTER TOOL

BACKGROUND OF THE INVENTION

Many anchor products are available at the time of the creation of this document to secure items to earthen and others mediums including soil, wood, and ice. Most of these anchors are intended to be driven in to their designed medium exclusively by human provided energy. Because of varying medium conditions and anchor designs, it can be difficult to install the anchors and a method of adapting anchors to a driver capable of providing an alternate energy source to the anchor can save time and effort for the installer.

The objective of the anchor driver adapter tool is to afford multiple anchor designs a method to attach to an independently powered tool such as an electrically or engine driven energy device. This allows the installer the freedom to concentrate on the precise location and angle of installation rather than focusing their attention on the effort needed to install them. It also affords the installer much more control of the anchor as the intent is to create a rigid system free of joints which can prevent guiding forces from being transmitted into the anchor, thus preventing it from being installed at all in certain circumstances.

Another objective is to allow installation of the anchors into more tightly confined spaces. Many anchor designs are intended to be installed by using a bar acting as a lever to transmit torque from the installer into the anchor. This bar may require a space with about a 2' diameter of circular area to be available around the anchor and this required area can be greater depending on the size of the anchor or how much torque is available to drive the anchor. Using the adapter tool, an installer can minimize the space requirement to as little as that which the adapter takes up.

Additionally, the productivity of an installer can be increased significantly by allowing an independently powered driver to perform the majority of the work to install the anchors. It also can usually be done much more quickly than by human energy alone depending on the type and associated design of the anchor.

SUMMARY OF THE INVENTION

The anchor adapter tool provides a means to accommodate and rigidly hold various anchor designs including many “wood”, “Earth” or “ground,” and “ice” “anchors” while providing a means to attach a driver capable of providing the energy necessary to install the anchor. All anchors are intended to be clamped in the adapter by a means of a threaded bolt and nut which presses a securing plate onto the anchor. Clamping force can be increased by increasing the torque applied to the nut. Weld beads are present on the clamp plate and frame body in strategic locations to reduce the potential of the anchor shaft to slide and/or rotate in the adapter which maximizes control and minimizes the “joint effect” that may be present without them. Magnets are provided for convenience at ideal locations to assist in temporarily holding separate parts while anchors are inserted in and removed from the adapter. The adapter can be coupled to a driver by various standard designs including, but not limited to square and hex drive rods, direct welding, integrated common shaft, and other typical coupling methods. The anchor adapter tool is a scalable design allowing it to be fabricated to meet the requirements to successfully drive anchors of various sizes.

BRIEF DESCRIPTION OF THE DRAWINGS

FIG. 1 is an isometric overview of the assembled tool;

FIG. 2 is an exploded view of the components of the tool.

DETAILED DESCRIPTION OF THE PREFERRED EMBODIMENT

Referring to the figures, an anchor driver adapter tool includes a means of coupling to the driver 1, 5, 6, 9, 11 which includes square and hexagonal rods and other methods to allow compatibility with a given driver. Hexagonal rod 11 enables direct coupling of a standard drill chuck to the device and offers the additional capability to apply axial forces in both directions to the tool rather than just those offered by a standard socket (square drive) coupling. Threaded rod 1 allows nut 10 to press clamp plate 2 onto the anchor and secure the anchor to the tool effectively enabling it to act as a single (rigid) unit for increased control and stability. Top plate 4, which is welded to the frame 3, acts as a connecting member to transmit torque and forces into the frame 3. The clamp plate magnet 8 is intended to be used to temporarily hold nut 10 and additionally provide a means to grasp the end of the clamp plate 2 for removal when nut 10 is attached to it. The frame magnet 8 is intended to be used to temporarily hold clamping plate 2 and nut 10 while an anchor is being installed and removed from the adapter. Fastening screws 7 are used to secure the magnets in place. Materials are selected for the components based on the anticipated loads applied to those components.

The invention claimed is:

1. An adapter tool which provides a rigid connection to an eye-type anchor comprising: a hollow rectangular body with a removable plate on one side providing an opening for the anchor eye, a threaded rod centrally located in the width direction of the internal compartment of said body, a first end of the threaded rod affixed to an internal wall of the compartment and a second end configured to receive the anchor eye thereon, said plate configured to be positioned on said threaded rod via an aperture in the plate, and pressed against said anchor eye by a threaded nut on the threaded rod to secure the anchor eye on the threaded rod, dimensions of said body width and height being fixed, and the internal depth being variable by movement of said plate along the threaded rod, said plate being substantially planar, with a shape defined by an arch in the radial direction of said aperture on one side, and two sides adjacent to the arch being parallel to each other, with one side of said body having an aperture defined by an arch and parallel sides corresponding to the plate, to accept said plate, and a square or hexagonal coupling attached to an upper surface of said body configured for connection with a driver interface to the tool.

* * * * *